US012641563B2

(12) United States Patent
Xiang et al.

(10) Patent No.: US 12,641,563 B2
(45) Date of Patent: May 26, 2026

(54) METHODS AND APPARATUS FOR PROVISIONING PRIVATE NETWORK DEVICES DURING ONBOARDING

(71) Applicant: Huawei Technologies Co., Ltd., Shenzhen (CN)

(72) Inventors: Zhixian Xiang, Frisco, TX (US); Khosrow Tony Saboorian, Plano, TX (US); Kaippallimalil Mathew John, Carrollton, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 549 days.

(21) Appl. No.: 17/982,131

(22) Filed: Nov. 7, 2022

(65) Prior Publication Data

US 2023/0099786 A1 Mar. 30, 2023

Related U.S. Application Data

(63) Continuation of application No. PCT/US2021/031169, filed on May 6, 2021.

(60) Provisional application No. 63/021,449, filed on May 7, 2020.

(51) Int. Cl.
*H04W 60/04* (2009.01)
*H04W 76/10* (2018.01)

(52) U.S. Cl.
CPC ........... *H04W 60/04* (2013.01); *H04W 76/10* (2018.02)

(58) Field of Classification Search
CPC .............................. H04W 60/04; H04W 76/10
See application file for complete search history.

(56) References Cited

U.S. PATENT DOCUMENTS

| | | | | |
|---|---|---|---|---|
| 2018/0160387 A1* | 6/2018 | Chastain | ................. | H04W 8/26 |
| 2018/0199279 A1* | 7/2018 | Baek | ..................... | H04W 16/14 |
| 2019/0007500 A1* | 1/2019 | Kim | ........................ | H04L 67/141 |
| 2020/0008052 A1* | 1/2020 | Bas Sanchez | ........ | H04W 60/00 |
| 2020/0178320 A1* | 6/2020 | Dowlatkhah | ........... | H04W 8/04 |
| 2020/0275273 A1* | 8/2020 | Smith | ................... | H04W 12/50 |
| 2021/0112413 A1* | 4/2021 | Pazhyannur | .......... | H04W 76/10 |
| 2021/0400489 A1* | 12/2021 | Starsinic | ............... | H04W 60/04 |
| 2023/0156457 A1* | 5/2023 | Liu | ........................ | H04W 60/04 |
| | | | | 455/418 |

FOREIGN PATENT DOCUMENTS

WO 2020068765 A1 4/2020

OTHER PUBLICATIONS

3GPP TR 23.700-07 V0.3.0 (Year: 2020).*

(Continued)

*Primary Examiner* — Charles N Appiah
*Assistant Examiner* — Nicole M Louis-Fils
(74) *Attorney, Agent, or Firm* — Slater Matsil, LLP

(57) ABSTRACT

A method for operating a user equipment (UE) includes transmitting, by the UE, a registration request message to establish a connection for onboarding, the registration message comprising an onboarding and provisioning indication information; and completing, by the UE with a network entity, provisioning in accordance with the onboarding and provisioning indication information.

22 Claims, 12 Drawing Sheets

(56)     References Cited

OTHER PUBLICATIONS

"3rd Generation Partnership Project; Technical Specification Group Services and System Aspects; Study on enhanced support of non-public networks (Release 17)," 3GPP TR 23.700-07, V1.2.0, Nov. 2020, 247 pages.
"3rd Generation Partnership Project; Technical Specification Group Services and System Aspects; Study on enhanced support of non-public networks (Release 17)", 3GPP TR 23.700-07 V0.3.0, Technical Report, Jan. 2020, 42 Pages.

* cited by examiner

350

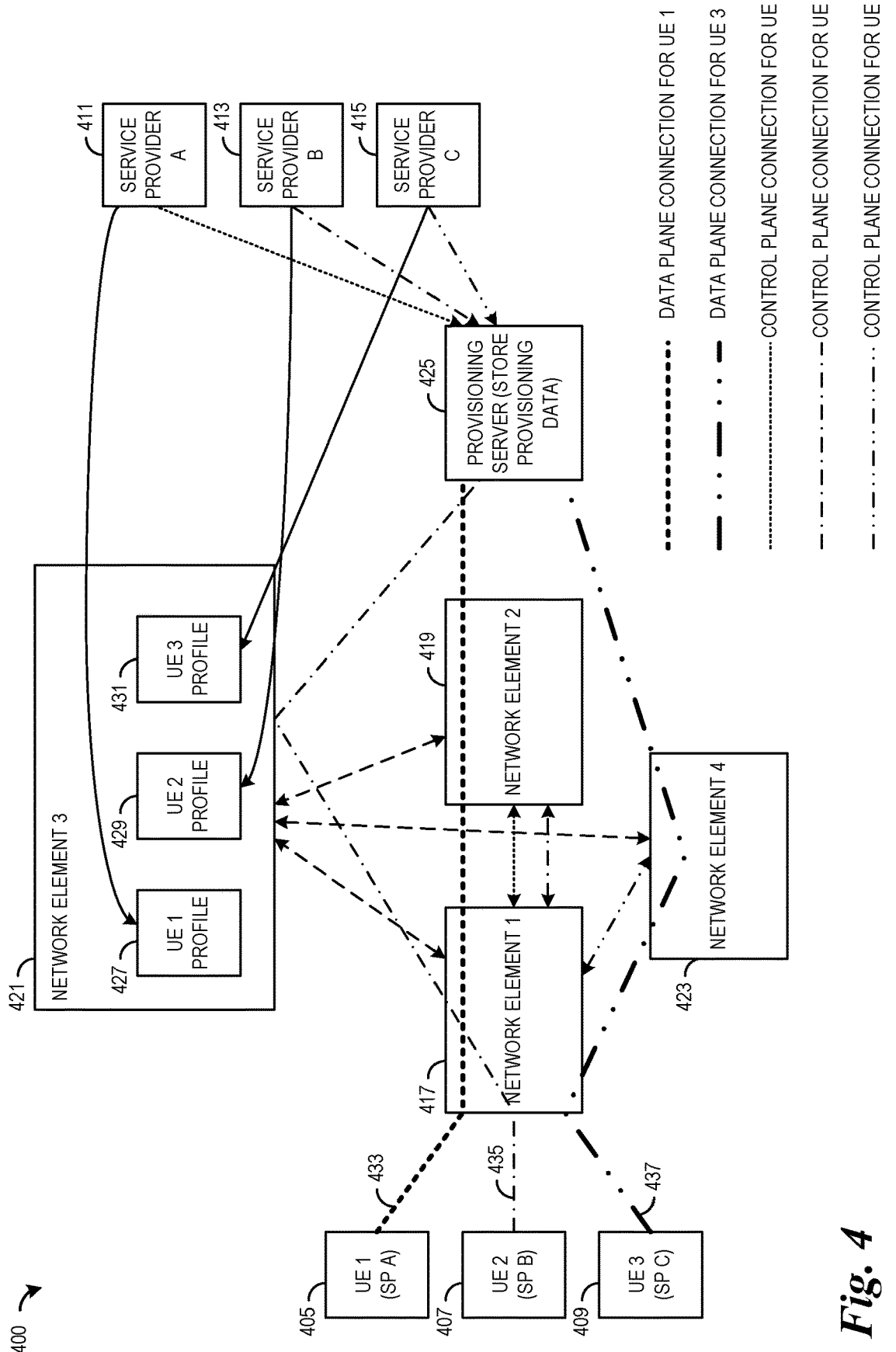

400

411 SERVICE PROVIDER A
413 SERVICE PROVIDER B
415 SERVICE PROVIDER C

425 PROVISIONING SERVER (STORE PROVISIONING DATA)

421 NETWORK ELEMENT 3

431 UE 3 PROFILE
429 UE 2 PROFILE
427 UE 1 PROFILE

419 NETWORK ELEMENT 2

423 NETWORK ELEMENT 4

417 NETWORK ELEMENT 1

433 UE 1 (SP A)
405

435 UE 2 (SP B)
407

437 UE 3 (SP C)
409

• • • • • • •  DATA PLANE CONNECTION FOR UE 1
— • • — • •  DATA PLANE CONNECTION FOR UE 3
• • • • • • •  CONTROL PLANE CONNECTION FOR UE 1
— • • — • •  CONTROL PLANE CONNECTION FOR UE 2
— • • — • •  CONTROL PLANE CONNECTION FOR UE 3

*Fig. 4*

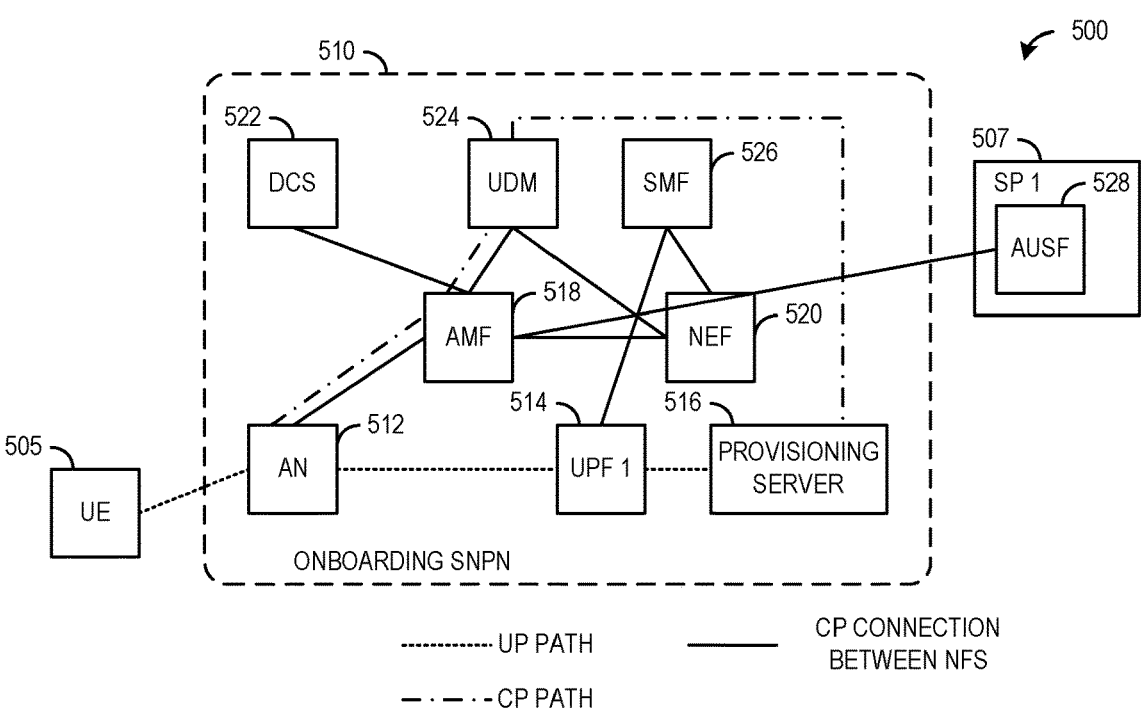
Fig. 5
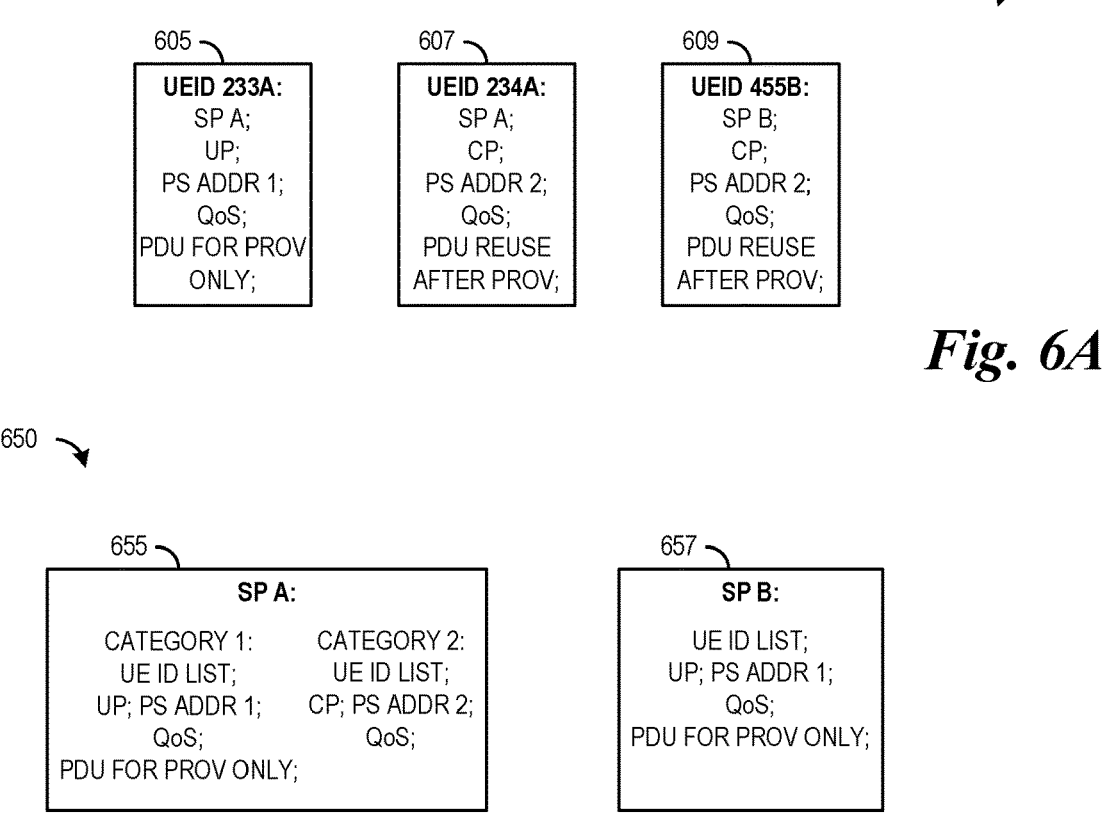
Fig. 6A
Fig. 6B

PROCESSING
UNIT
1402

1400

1414

CPU

1404

MASS
STORAGE

NETWORKS

NETWORK
INTERFACES

1406

1420

1408

MEMORY

VIDEO
ADAPTER

1410

I/O
INTERFACE

1412

DISPLAY

1418

MOUSE/
KEYBOARD/
PRINTER

1416

1422

METHODS AND APPARATUS FOR PROVISIONING PRIVATE NETWORK DEVICES DURING ONBOARDING

CROSS-REFERENCE TO RELATED APPLICATIONS

This application is a continuation of International Patent Application No. PCT/US2021/031169, filed May 6, 2021, entitled "Method and Apparatus for Provisioning Private Network Devices During Onboarding," which claims the benefit of U.S. Provisional Application No. 63/021,449, filed on May 7, 2020, entitled "Method and Apparatus for Provisioning Subscription-based Private Network Device Onboarding," applications of which are hereby incorporated herein by reference in their entireties.

TECHNICAL FIELD

The present disclosure relates generally to methods and apparatus for digital communications, and, in particular embodiments, to methods and apparatus for provisioning private network devices during onboarding.

BACKGROUND

A stand-alone non-public network (SNPN) is a network operated by a non-public network (NPN) operator that does not rely on network functions provided by a public-line mobile network (PLMN). In other words, a SNPN enables the deployment of a Fifth Generation (5G) network for private use, with no dependencies to public 5G networks.

Onboarding is the process by which a new device gains access to the wired or wireless network for the first time. In the mobile private network deployment, that is process that allows a device, such as an Internet of Things (IoT) device, to be configured with the right credential and configuration to be able to connect to the right network for the first time. As used herein, the right network refers to the network which the device can get connectivity service to allow user to obtain desired service).

A study item regarding network enhancement for NPNs involves the architecture and solutions to support device onboarding for situations where devices are deployed without correct subscription information. In such a situation, providing correct subscription information or credentials to the devices is a problem.

SUMMARY

According to a first aspect, a method for operating a user equipment (UE) is provided. The method comprising: transmitting, by the UE, a registration request message to establish a connection for onboarding, the registration message comprising an onboarding and provisioning indication information; and completing, by the UE with a network entity, provisioning in accordance with the onboarding and provisioning indication information.

In a first implementation form of the method according to the first aspect, the onboarding and provision indication information comprising at least one of an indication indicating the connection is for onboarding and provisioning, or a provisioning method indication indicating a provisioning method preferred or supported by the UE.

In a second implementation form of the method according to the first aspect or any preceding implementation form of the first aspect, the provisioning method indication indicating at least one of control plane (CP) based remote provisioning or user plane (UP) based remote provisioning.

In a third implementation form of the method according to the first aspect or any preceding implementation form of the first aspect, the registration message further comprising a temporary identifier for the UE and an onboarding method capability indication for the UE, the onboarding method capability indication indicating a provisioning method supported by the UE.

In a fourth implementation form of the method according to the first aspect or any preceding implementation form of the first aspect, the temporary identifier comprising at least one of a sequence number from a range assigned to a service provider associated with the UE, an identifier of the service provider owning a subscription of the UE, and a secret mark value determined in accordance with a credential used for the onboarding for the UE.

In a fifth implementation form of the method according to the first aspect or any preceding implementation form of the first aspect, the secret mark value being provided by the service provider owning the subscription of the UE.

In a sixth implementation form of the method according to the first aspect or any preceding implementation form of the first aspect, the provisioning method indication indicating the CP based remote provisioning, and completing the provisioning comprises receiving, by the UE from the network entity, provisioning information in a first control message.

In a seventh implementation form of the method according to the first aspect or any preceding implementation form of the first aspect, the provisioning method indication indicating the provisioning method preferred by the UE, the method further comprising receiving, by UE from the network entity, a second control message indicating a provision method that will be used for provisioning, and completing the provisioning comprising completing the provisioning in accordance with the provisioning method indicated by the second control message.

In an eighth implementation form of the method according to the first aspect or any preceding implementation form of the first aspect, the network entity comprising an access and mobility management function (AMF).

In a ninth implementation form of the method according to the first aspect or any preceding implementation form of the first aspect, the provisioning method indication indicating the UP based remote provisioning, and completing the provisioning comprises: determining, by the UE, an expiration of a timer associated with CP based provisioning without having received a third control message including provisioning information; establishing, by the UE, a protocol data unit (PDU) session for provisioning; and receiving, by the UE from a provisioning server (PS), provisioning information.

In a tenth implementation form of the method according to the first aspect or any preceding implementation form of the first aspect, the onboarding and provision indication information comprising a PS address or a provisioning domain name.

In an eleventh implementation form of the method according to the first aspect or any preceding implementation form of the first aspect, the onboarding and provision indication information implicitly indicating a provisioning method supported by the UE.

According to a second aspect, a method for operating a network entity is provided. The method comprising: receiving, by the network entity from a UE, a registration request message to establish a connection for onboarding, the registration request message comprising an onboarding and provisioning indication information; retrieving, by the network entity, a network configuration profile associated with the UE; and completing, by the network entity with the UE, provisioning of the UE in accordance with the network configuration profile and the onboarding and provisioning indication information.

In a first implementation form of the method according to the second aspect, the onboarding and provision indication information comprising at least one of an indication indicating the connection is for onboarding and provisioning, or a provisioning method indication indicating a provisioning method preferred or supported by the UE.

In a second implementation form of the method according to the second aspect or any preceding implementation form of the second aspect, the network configuration profile comprising a user subscription profile or network configuration information used to configure the network entity for onboarding and provisioning.

In a third implementation form of the method according to the second aspect or any preceding implementation form of the second aspect, the provisioning method comprising UP based provisioning or CP based provisioning.

In a fourth implementation form of the method according to the second aspect or any preceding implementation form of the second aspect, the network configuration profile comprising at least one of identifier information of a service provider owning a subscription of the UE, a provisioning method, a provisioning server address, network slice for onboarding and provisioning information, a PDU profile, or a selection criteria for a network entity associated with the onboarding and provisioning.

In a fifth implementation form of the method according to the second aspect or any preceding implementation form of the second aspect, the PDU profile comprising at least one of quality of service (QoS) requirements, or PDU session reusable information for after provisioning, the PDU session reusable information for after provisioning including an indication if the PDU session can be reused after onboarding, or a waiting time to terminate the PDU session after provisioning completes.

In a sixth implementation form of the method according to the second aspect or any preceding implementation form of the second aspect, the selection criteria comprising an AMF or session management function (SMF) selection criteria.

In a seventh implementation form of the method according to the second aspect or any preceding implementation form of the second aspect, the network configuration profile being retrieved from a unified data management (UDM) function, a default credential server, a policy configuration function (PCF), an operation support system (OSS), a network repository function (NRF), or a network entity providing network configuration and policy management.

In an eighth implementation form of the method according to the second aspect or any preceding implementation form of the second aspect, the provisioning method indication indicating that the connection is for onboarding.

In a ninth implementation form of the method according to the second aspect or any preceding implementation form of the second aspect, the onboarding and provision indication information comprising a provisioning server address or a provisioning domain name.

In a tenth implementation form of the method according to the second aspect or any preceding implementation form of the second aspect, further comprising determining a provisioning method supported by the UE in accordance with the onboarding and provision indication information.

According to a third aspect, a UE is provided. The UE comprising: one or more processors; and a non-transitory memory storage comprising instructions that, when executed by the one or more processors, cause the UE to: transmit a registration message to establish a connection for onboarding, the registration message comprising an onboarding and provisioning indication information; and complete, with a network entity, provisioning in accordance with the onboarding and provisioning indication information.

In a first implementation form of the UE according to the third aspect, the onboarding and provision indication information comprising at least one of an indication indicating the connection is for onboarding and provisioning, or a provisioning method indication indicating a provisioning method preferred or supported by the UE In a second implementation form of the UE according to the third aspect or any preceding implementation form of the third aspect, the provisioning method indication indicating at least one of CP based remote provisioning or UP based remote provisioning.

In a third implementation form of the UE according to the third aspect or any preceding implementation form of the third aspect, the registration message further comprising a temporary identifier for the UE and an onboarding method capability indication for the UE, the onboarding method capability indication indicating a provisioning method supported by the UE.

In a fourth implementation form of the UE according to the third aspect or any preceding implementation form of the third aspect, the temporary identifier comprising at least one of a sequence number from a range assigned to a service provider associated with the UE, an identifier of the service provider owning a subscription of the UE, and a secret mark value determined in accordance with a credential used for the onboarding for the UE.

In a fifth implementation form of the UE according to the third aspect or any preceding implementation form of the third aspect, the provisioning method indication indicating the CP based remote provisioning, and the instructions further causing the UE to receive, from the network entity, provisioning information in a first control message.

In a sixth implementation form of the UE according to the third aspect or any preceding implementation form of the third aspect, the provisioning method indication indicating the provisioning method preferred by the UE, the instructions further causing the UE to receive, from the network entity, a second control message indicating a provision method that will be used for provisioning, and the provisioning being completed in accordance with the provisioning method indicated by the second control message.

In a seventh implementation form of the UE according to the third aspect or any preceding implementation form of the third aspect, the provisioning method indication indicating the UP based remote provisioning, and the instructions further causing the UE to determine an expiration of a timer associated with CP based provisioning without having received a third control message including provisioning information; establish a PDU session for provisioning; and receive, from a provisioning server (PS), provisioning information.

According to a fourth aspect, a network entity is provided. The network entity comprising: one or more processors; and a non-transitory memory storage comprising instructions that, when executed by the one or more processors, cause the network entity to: receive, entity from a UE, a registration request message to establish a connection for onboarding, the registration request message comprising an onboarding and provisioning indication information; retrieve a network configuration profile associated with the UE; and complete, with the UE, provisioning of the UE in accordance with the network configuration profile and the onboarding and provisioning indication information.

In a first implementation form of the network entity according to the fourth aspect, the onboarding and provision indication information comprising at least one of an indication indicating the connection is for onboarding and provisioning, or a provisioning method indication indicating a provisioning method preferred or supported by the UE.

In a second implementation form of the network entity according to the fourth aspect or any preceding implementation form of the fourth aspect, the network configuration profile comprising a user subscription profile or network configuration information used to configure the network entity for onboarding and provisioning.

In a third implementation form of the network entity according to the fourth aspect or any preceding implementation form of the fourth aspect, the provisioning method comprising UP based provisioning or CP based provisioning.

In a fourth implementation form of the network entity according to the fourth aspect or any preceding implementation form of the fourth aspect, the network configuration profile comprising at least one of identifier information of a service provider owning a subscription of the UE, a provisioning method, a provisioning server address, network slice for onboarding and provisioning information, a PDU profile, or a selection criteria network entity associated with the onboarding and provisioning.

In a fifth implementation form of the network entity according to the fourth aspect or any preceding implementation form of the fourth aspect, the PDU profile comprising at least one of QoS requirements, or PDU session reusable information for after provisioning, the PDU session reusable information for after provisioning including an indication if the PDU session can be reused after onboarding, or a waiting time to terminate the PDU session after provisioning.

In a sixth implementation form of the network entity according to the fourth aspect or any preceding implementation form of the fourth aspect, the network configuration profile being retrieved from a UDM function, a default credential server, a PCF, an OSS, a NRF, or a network entity providing network configuration and policy management.

In a seventh implementation form of the network entity according to the fourth aspect or any preceding implementation form of the fourth aspect, the provisioning method indication indicating that the connection is for onboarding.

An advantage of a preferred embodiment is that device profiles associated with specific devices or device types are stored at a network function. The device profile may be rapidly retrieved and used to support device onboarding and session establishment.

Yet another advantage of a preferred embodiment is that an indication of provisioning type supported by a device is signaled by the device during session establishment. Indicating the provisioning type can help accelerate the provisioning process and improve overall performance.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates a communication system with multiple connections established for multiple UEs which belong to different service providers according to example embodiments presented herein;

FIG. 5 illustrates a communication network highlighting an example O-SNPN architecture, where the O-SNPN performs provisioning for multiple devices and multiple service providers according to example embodiments presented herein;

FIG. 6A illustrates a diagram of example device based subscription profiles according to example embodiments presented herein;

FIG. 6B illustrates a diagram of example service provider based subscription profiles according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
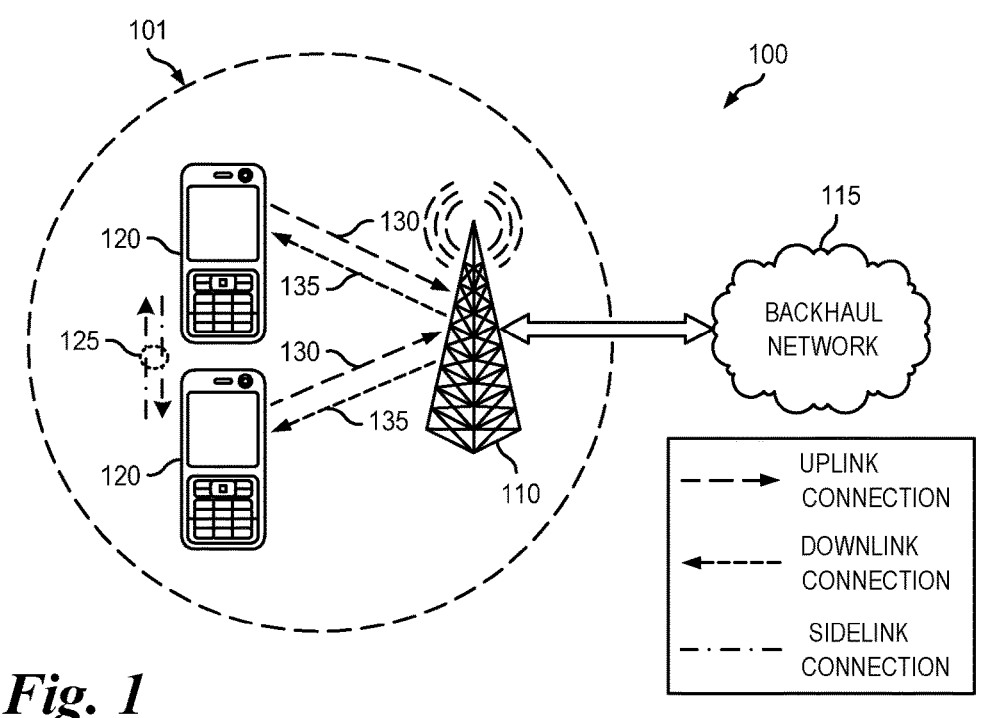
FIG. 1 illustrates a first example communications system.

FIG. 1 illustrates a first example communications system 100. Communications system 100 includes an access node 110, with coverage area 101, serving user equipments (UEs), such as UEs 120. Access node 11o is connected to a backhaul network 115 that provides connectivity to services and the Internet. In a first operating mode, communications to and from a UE passes through access node 110. In a second operating mode, communications to and from a UE do not pass through access node 110, however, access node 11o typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

Considerable research is being applied to network enhancements for private networks, i.e., non-public networks (NPNs). One issue being studied is the network architecture and solutions for supporting UE onboarding and provisioning for NPNs in the situation where UEs are deployed without correct subscription information. In such a situation, how are the correct subscription information or credentials provisioned to the UEs by way of the 3GPP network.

In general, device onboarding is the process in which a new device gains access to a wired or wireless network for the first time. In a mobile private network deployment, device onboarding allows devices, such as Internet of Things (IoT) devices, to be configured with the right credentials and configuration to be able to connect to the right network for the first time. As used herein, the right network refers to the network in which the device can obtain connectivity service to allow the device to obtain desired services.

Similarly, provisioning is the process that allows the wireless network that provides the over-the-air connectivity (based on the information or indication associated with the device (with some of the information being provided by the device and some of the information being provided by network management entities, for example) to configure the network appropriately to provide the right configuration (e.g., credential keys, Quality of Service (QoS) requirements, capability configuration for the network the device is connecting to, and so on) to the device over-the-air to allow the device to obtain the connectivity service from the network with which the device has a subscription.

However, prior to provisioning, the device does not have the right credentials (e.g., security key or certificate of the network that the device wants to connect to, as well as subscription information, including service QoS requirements, charging information, etc.), and so on), a default configuration of the device is assumed and is used for provisioning. As an example, the device is assumed to have a particular radio configuration (such as operating band, subcarrier spacing, etc.), temporary device identifier, preferred network identifier for provisioning, provision method, and so on).

Figure 2:
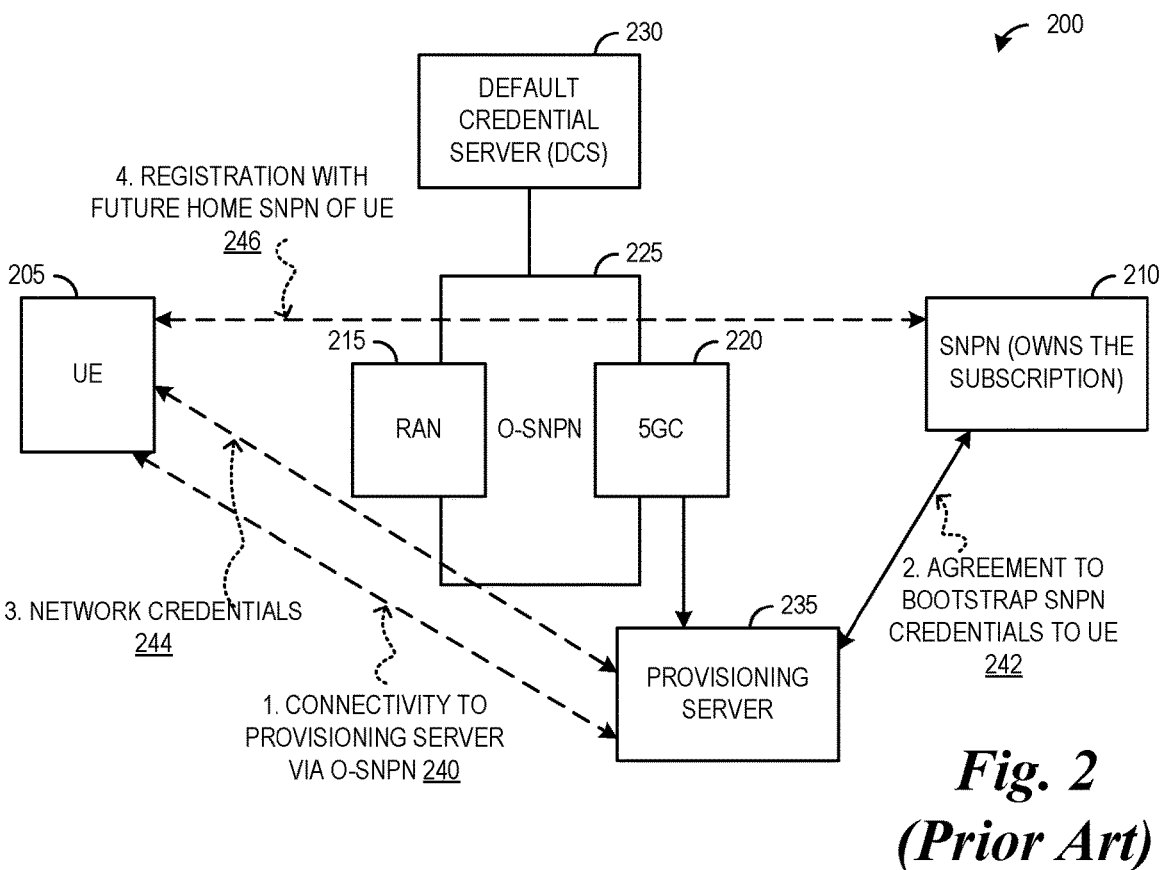
FIG. 2 illustrates a communication system highlighting a prior art technique enabling device connectivity to a standalone NPN (SNPN)

FIG. 2 illustrates a communication system 200 highlighting a prior art technique enabling device connectivity to a stand-alone NPN (SNPN). The prior art technique supports a UE 205 obtaining connectivity to SNPN 210. SNPN 210 is referred to as the onboarding SNPN. Once UE 205 obtains connectivity, UE 205 can be provisioned with network credentials and configuration for SNPN 210 that will own the subscription of UE 205. Communication system 200 also includes a radio access network (RAN) 215 providing wireless access for UE 205 and a Fifth Generation Core network (5GC) 220 providing 5G functionality. An onboarding SNPN (O-SNPN) 225 is dedicated for provisioning UE 205 (and other devices) with the assistance of a default credential server (DCS) 230 and a provisioning server 235.

The prior art technique involves: (1) UE 205 establishing connectivity to provisioning server 235 (event 240); Provisioning server 235 has an agreement with SNPN 210 to bootstrap SNPN credentials to UE 205 (event 242); UE 205 obtains network credentials (event 244); and UE 205 exchange communication with SNPN 210 to complete the registration with SNPN 210, which becomes the home SNPN of UE 205 (event 246).

Figure 3A:
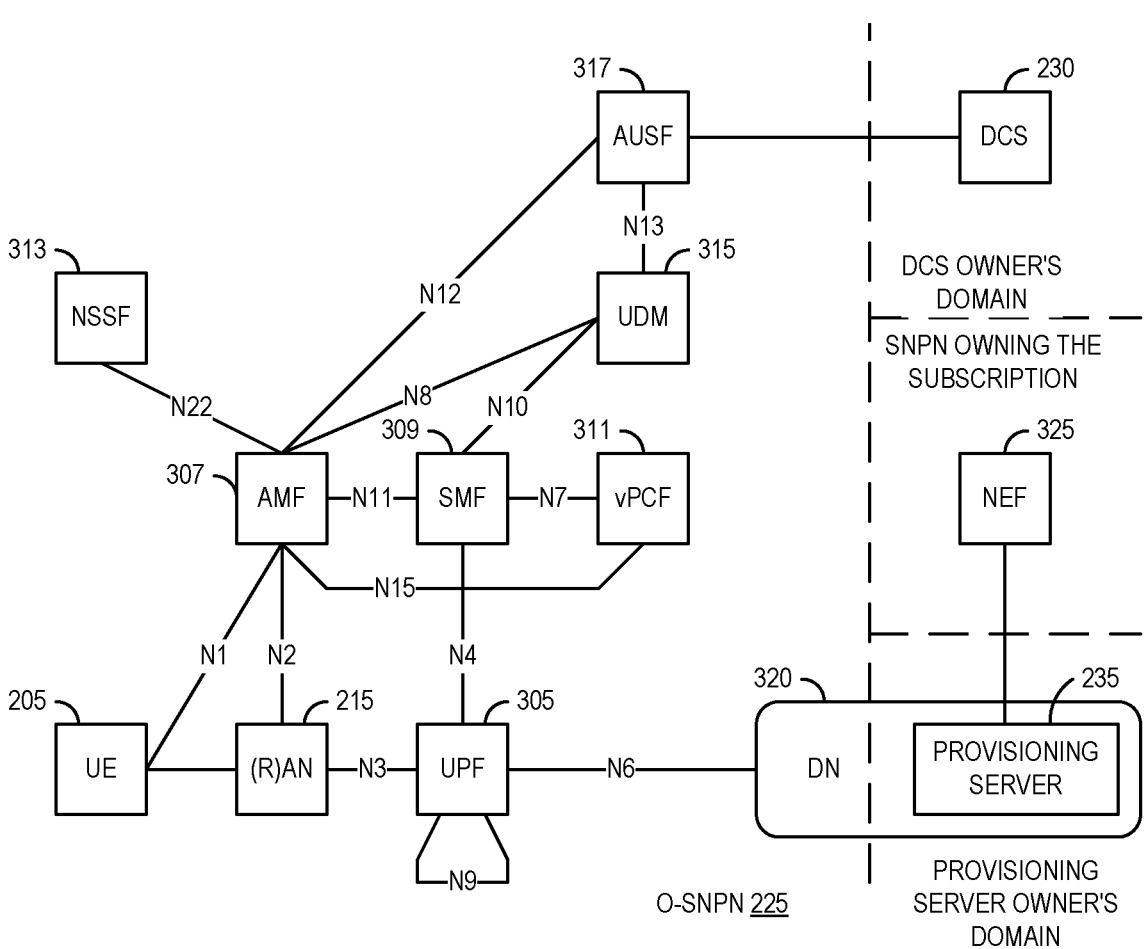
FIG. 3A illustrates a diagram highlighting a first prior art architecture of an onboarding SNPN (O-SNPN)

FIG. 3A illustrates a diagram 300 highlighting a first prior art architecture of O-SNPN 225. First prior art architecture of O-SNPN 225 provides a user plane (UP) based solution where O-SNPN 225 establishes a temporary UP for provisioning UE 205. As shown in FIG. 3A, O-SNPN 225 includes 5G functions such as a user plane function (UPF) 305, an access and mobility management function (AMF) 307, a session management function (SMF) 309, a virtual policy control function (vPCF) 311, a network slice selection function (NSSF) 313, a unified data management function (UDM) 315, and an authentication server function (AUSF) 317. UPF 305 of O-SNPN 225 is used to establish a defined network (DN) 320 for UE 205 to enable provisioning the provisioning of UE 205 by provisioning server 235. A network exposure function (NEF) of SNPN 210 may provide the provisioning information for UE 205 to provisioning server 235.

An issue exists with static network configuration for provisioning. In the prior art solution shown in FIG. 3A, UDM 315 is not used and the PDU configuration is relatively static or preconfigured in the communication system for provisioning. The prior art solution does not support the dynamic configuration of the communication system based on the needs of different devices and service providers. As an example, there is no UE specific profile based dynamic network function selection for AMF 307, SMF 309, and provisioning server 235. Instead, RAN 215 and AMF 307 are preconfigured to select corresponding network functions when UE 205 is detected for onboarding. Furthermore, the data connection between UE 205 and the communication system may use a default connection configuration.

Figure 3B:
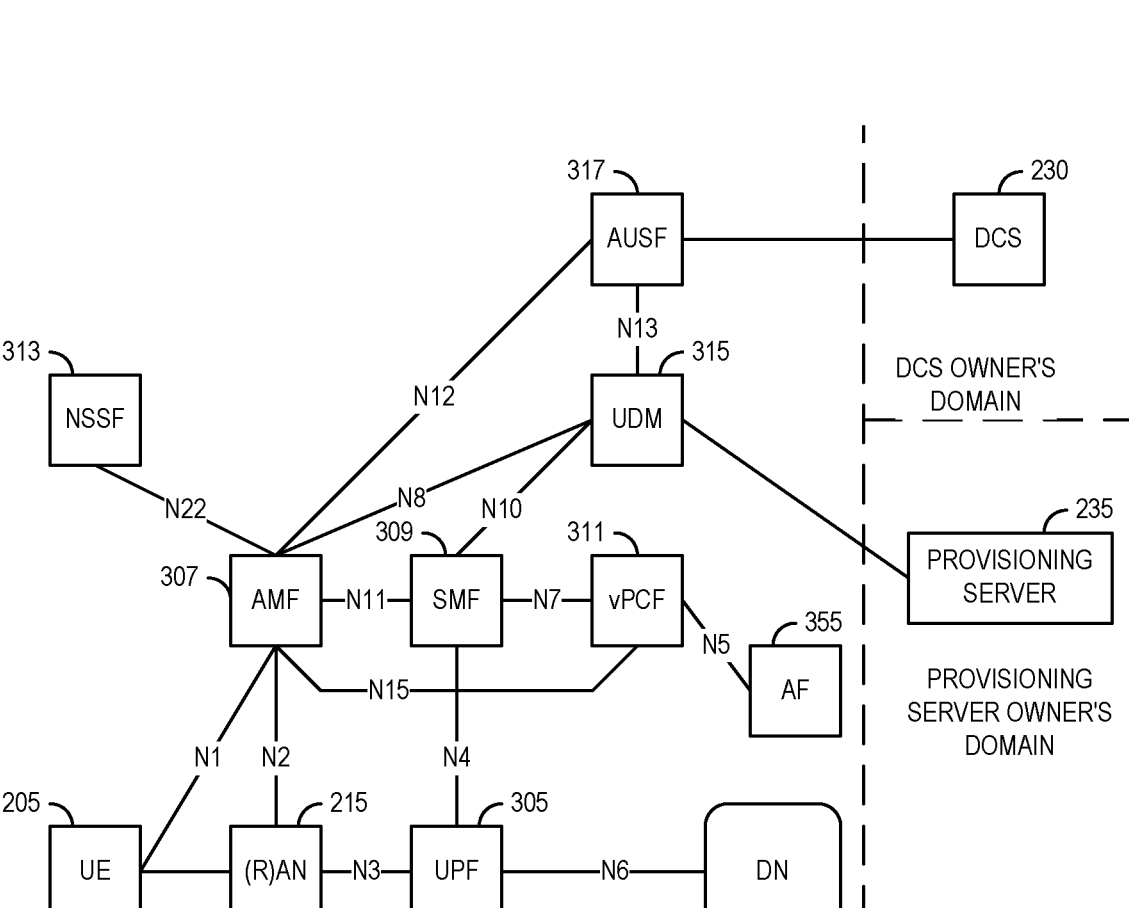
FIG. 3B illustrates a diagram highlighting a second prior art architecture of an O-SNPN

FIG. 3B illustrates a diagram 350 highlighting a second prior art architecture of O-SNPN 225. Second prior art architecture of O-SNPN 225 provides a control plane (CP) based solution where O-SNPN 225 uses non-access stratum (NAS) control messaging in the CP for provisioning UE

205. The 5G functions of O-SNPN 225 (including UPF 305, AMF 307, SMF 309, vPCF 311, NSSF 313, UDM 315, AUSF 317, and an application function (AF) 355 may be used to enable UE 205, provisioning server 235, and DCS 230 to exchange NAS messaging to provide provisioning information for UE 205.

An issue exists with lack of consideration for support of multiple service providers using a single provisioning network. In general, there exists an assumption that provisioning server 235 and DCS 230 may be independent third parties that provide provisioning service for all service providers, therefore, there may be different network behaviors according to the devices that are associated with different service providers but are using the same O-SNPN to perform provisioning. As an example, O-SNPN 225 may provide CP based provisioning for a UE from a first service provider by selecting a specific AMF and SMF instance, while provide UP based provisioning for a UE from a second service provider with a different AMF and SMF instance.

Furthermore, the prior art solution does not consider how a single onboarding network can dynamically support both UP and CP provisioning options for different devices. Therefore, there is a need for methods and apparatus for provisioning private network devices during onboarding.

According to an example embodiment, methods and apparatus for provisioning private network devices during onboarding are provided. The methods and apparatus support the dynamic configuration based on the needs of different devices and service providers associated with these different devices. Furthermore, the methods and apparatus support multiple service providers utilizing a network to provision their respective devices. Additionally, the provisioning of devices using different provisioning types is supported. As an example, UP based provisioning and CP based provisioning are supported in a single O-SNPN.

In an embodiment, a device requests a connection to a network in order to receive provisioning data associated with a service provider. The network selects a device profile that is associated with the service provider (and stored in a network element with device profiles associated with other service providers), and uses the device provide to configure and establish the connection for the device. The connection for the device may be a CP connection or a UP connection. The configuring and establishing of the connection includes establishing control plane connections between the network elements of the network. The provisioning data may then be provided to the device from a provisioning server, over the connection between the network and the device.

FIG. 4 illustrates a communication system 400 with multiple connections established for multiple UEs which belong to different service providers. Communication system 400 includes UEs 405, 407, and 409 (the UEs are examples of devices), with UE 405 belonging to service provider 411, UE 407 belonging to service provider 413, and UE 409 belonging to service provider 415. Communication system 400 also includes network elements 417, 419, 421, and 423. Network elements may be network functions (such as DCSs, UDMs, AMFs, SMFs, PCFs, etc.) or network entities (such as access nodes, TPs, TRPs, and so on). Communication system 400 also includes provisioning server 425, which is used to store provisioning data in this particular communication system. In other deployments, the provisioning data may be stored at other entities or elements. The connections and connection types shown in FIG. 4 are for illustrative purposes only, other connections and connection types may be utilized in other deployments.

As shown in FIG. 4, network element 421 stores UE profiles 427, 429, and 431, which are associated with UEs 405, 407, and 409, respectively. The UE profiles may be provided to network element 421 by the service providers, for example. Network elements 417, 419, 421, and 423 may be interconnected to share the UE profiles and other information.

As shown in FIG. 4, UEs 405, 407, and 409 have connections to provisioning server 425 to obtain provisioning data. The connections between the various UEs and provisioning server 425 may be of differing type. As an example, connection 433 between UE 405 and provisioning server 425 is a DP connection, connection 435 between UE 407 and provisioning server 425 is a CP connection, and connection 437 between UE 409 and provisioning server 425 is a UP connection. Furthermore, the connections may follow different paths through communication system 400.

As an example, in a private network for a media event, and at the media event, different media companies (equivalent to the service providers in this disclosure), such as COMPANY_1, COMPANY_2, COMPANY_3, etc., will bring many of their own devices. These devices may have never accessed the private network before and they do not have the correct configuration and credential to be able to access the private network. So the event's private network can become an O-SNPN to provide the provisioning service to these devices in order to allow the devices to obtain the right configuration. Because the devices are coming from different service providers which may have different business contracts with the private network provider, also the device capability may differ, hence the provisioning method and procedure may be different and the private network needs to be flexible to accommodate them.

In an embodiment, a network, the O-SNPN, is dedicated to perform provisioning for multiple devices and multiple service providers. The use of a single O-SNPN to perform provisioning for multiple devices and multiple service providers helps to improve the efficiency of the deployment because multiple networks do not have to be deployed, where multiple networks are deployed with each network being dedicated to supporting a single service provider and its associated devices, or each network is dedicated to supporting a single provisioning type (i.e., CP based provisioning or UP based provisioning), and so on.

FIG. 5 illustrates a communication network 500 highlighting an example O-SNPN architecture, where the O-SNPN performs provisioning for multiple devices and multiple service providers. Communication system 500 includes a UE 505 (an example device) with associated service provider 507. Service provider 507 includes AUSF 528. Communication system 500 includes O-SNPN 510 that is capable of performing provisioning for multiple devices and multiple service providers, although only one device and one service provider is shown in FIG. 5.

O-SNPN 510 includes network entities and network functions, such as access node 512, UPF 514, provisioning server 516, AMF 518, NEF 520, DCS 522, UDM 524, and SMF 526. As shown in FIG. 5, a CP based provisioning would involve communication between UE 505, AN 512, AMF 518, UDM 524, and provisioning server 516, while a UP based provisioning would involve communication between UE 505, AN 515, UPF 514, and provisioning server 516.

A comparison between FIG. 5 and FIG. 4 may show mappings between UDM 524 and network element 421, AN 512 and network element 417, and UPF 514 and network element 419 (or network element 423). The mapped network entities and network functions correspond to entities and functions performing similar tasks.

In an embodiment, the device that is in need of provisioning (referred to as the onboarding device) is empty without subscription, however, there are some default configurations that include a temporary identifier that can uniquely identify the device among other onboarding devices associated with the same service provider. The temporary identifier may be use for the entirety of the onboarding procedure and may be pre-configured in a network entity (e.g., a DCS, a UDM, a PCF, an operation support system (OSS), a network repository function (NRF), or another network function used in other provisioning architectures, such as IEEE trusted execution environment provisioning (TEEP) based architectures).

In an embodiment, the temporary identifier used for onboarding comprises one or more fields, where the number of fields and the order of the fields may vary:

A sequence number from a range of numbers assigned to the service provider associated with the device. The sequence number may be assigned by the onboarding network (e.g., O-SNPN), for example.

A service provider identifier.

A service provider secret mark value. The secret mark value may a value assigned and known only to the service provider. The secret mark value may only be configured to the device when the device is ready for provisioning. The secret mark value may be the result of a calculation based on an algorithm provided by the service provider. The secret mark value may utilize a timer as input to the algorithm to generate more dynamic values, making the secret mark value more secure.

The information within the temporary identifier (e.g., the service provider identifier and the sequence number) may be used by the onboarding network to process the device accordingly. As an example, the onboarding network uses the information to look up an entry stored in the network entity (e.g., a DCS, a UDM, a PCF, an OSS, a NRF, or another network function used in other provisioning architectures) to quickly determine the user and network configuration profile used in the provisioning procedure.

In an embodiment, onboarding or provisioning subscription information is stored at a network entity (e.g., a UDM, a DCS, a PCF, an OSS, a NRF, or another network function used in other provisioning architectures of the device onboarding operation). The onboarding or provisioning subscription information may be used by a AMF or SMF used for device network registration and PDU session establishment. The subscription information may be organized in the network entity with different alternatives.

Options for the subscription information include:

Option 1: Device based subscription information profiles—Device based subscription profiles include:

Service provider identifier,

Provisioning method (e.g., UP or CP),

Provisioning server address (different service providers may have different provisioning servers), Information of network slices for provisioning, PDU profile (e.g., QoS, indication of possible reuse of PDU session after completion of provisioning procedure, and so on), AMF or SMF selection criteria for the provisioning of the device.

Option 2: Service provider based subscription information profiles—As an example, for the case where the onboarding network is different from the service provider and the onboarding network provides onboarding service for different service providers. All devices belonging to that service provider and having the same category will share the same onboarding subscription. The network entity storing the subscription information uses the temporary identifier of the device to derive the subscription information for the device, for example. Each service provider's subscription information profile may also be combined with different types of provisioning category for different devices based on business need. As an example, different types of categories will provision with different provision information and use different provisioning method (e.g., UP or CP), or use a different provisioning server, different network slices, and so on.

FIG. 6A illustrates a diagram 600 of example device based subscription profiles. Diagram 600 presents three example device based subscription profiles, profiles 605, 607, and 609. Each device based subscription profile includes a temporary identifier, a service provider identifier, a provisioning method indication, a PDU profile, and so on. Different profiles may have different numbers of fields. Furthermore, similar fields in different profiles may have different values.

FIG. 6B illustrates a diagram 650 of example service provider based subscription profiles. Diagram 650 presents two example service provider based subscription profiles, profiles 655 and 657. Each service provider based subscription profile includes a service provider identifier, and one or more device categories, with each device category including a list of temporary device identifiers, provisioning method indications, PDU profiles, and so on. Profile 655 includes information for two different device categories, while profile 657 includes information for a single device category. Different profiles may have different numbers of categories or fields. Furthermore, similar fields in different profiles may have different values.

Option 1 may provide greater flexibility than Option 2 with regard to customizing individual device provisioning. Furthermore, it aligns better with existing per device provisioning. Option 2 provides greater efficiency in provisioning operations, because there is no difference between devices within a single category of a service provider when it comes to connectivity for the provisioning procedure.

In an embodiment, if the provision subscription information is device based (i.e., Option 1), as soon as the device completes provisioning, the AMF may send a notification to the UDM to remove the provision subscription information entry associated with the device (the temporary identifier). The AMF knows the completion of the device provisioning when it receives a device deregistration request after the provisioning completes or when the device triggers a PDU session modification after the completion of the provisioning. The AMF may also send this notification to the DCS to remove the provisioned device information. The subscription information entry may also be provided with an existence timer, where when the existence timer expires, the subscription information entry may be removed. The subscription information entry may be temporarily removed by setting an indication associated with the subscription information entry or the subscription information entry may be moved to a used entry buffer, rather than being permanently deleted.

The subscription information entry may be dynamically provisioned (e.g., generated, updated, or deleted) into the UDM from the service provider using an interface between the UDM and the service provider, such as, the UDP, NEF, and AF interface.

The embodiment discussed above presents an example utilization with the UDM being the network function storing the subscription information. The subscription information may be stored and used by other network functions that are involved with device provisioning or onboarding.

In an embodiment, the device transmits a registration request message to establish a connection and initiate provisioning. The registration request message may initiate the establishment of a connection, where the connection is intended for provisioning the device. The registration request message includes onboarding and provisioning indication information to inform the network that the device is intending to initiate onboarding. In an embodiment, the onboarding and provisioning indication information includes an indication that the connection is for provisioning. The indication may be a one bit, two valued indication. In an embodiment, the onboarding and provisioning indication information includes a provisioning method indication (or information element). The provisioning method indication indicates a provisioning method (CP, UP, or both CP and UP) that the device prefers or supports. As an alternative, the onboarding and provisioning indication information may be stored in a subscription information entry of the device.

In an embodiment, a provisioning method indication (or information element) indicates the device's preference or support for CP or UP (or both CP and UP) provisioning. The provisioning method indication may be stored in the subscription information entry associated with the device. The provisioning method indication may also be conveyed in a message transmitted by the device to the network during the network registration phase. The device may have its own provisioning method indication (supporting CP, UP, or both) that is not part of the default subscription information entry. The provisioning method indication, in this situation, may be set by a vendor of the device, for example. When there is a conflict in provisioning method indications, the provisioning method indication of the device may take precedence. Alternatively, the default provisioning method indication in the default subscription information entry takes precedence.

In a situation when the device includes preference or support for either or both provisioning methods during the initial network registration phase (such as including the provisioning method indication in the registration request message transmitted to the network), the network may also use this occurrence as an indication that the device is connecting for provisioning purposes. Another option may be to have another dedicated provisioning method indication be transmitted by the device to the network to indicate to the network that the device is accessing the network only for provisioning.

In an embodiment, when the network receives a provisioning method indication from a device, the network will utilize the provisioning method indication, along with the subscription information entry associated with the device to complete the provisioning procedure. If the provisioning method indication indicates the provisioning method supported by the device, then if the device supports both CP and UP based provisioning, the network will use the subscription information to make a selection. If there is no provisioning method indication, but the capability indication is present, then if the device supports both CP and UP based provisioning, the network will use the subscription information to make a selection. In such a situation, the network sends the capability indication to the device during the device network registration phase. The network may use a NAS message to communicate with the device. If there is no provisioning method indication, but the capability indication is present, then if the device supports only one (either CP or UP), the network will use the supported provisioning method for the provisioning procedure.

Figure 7:
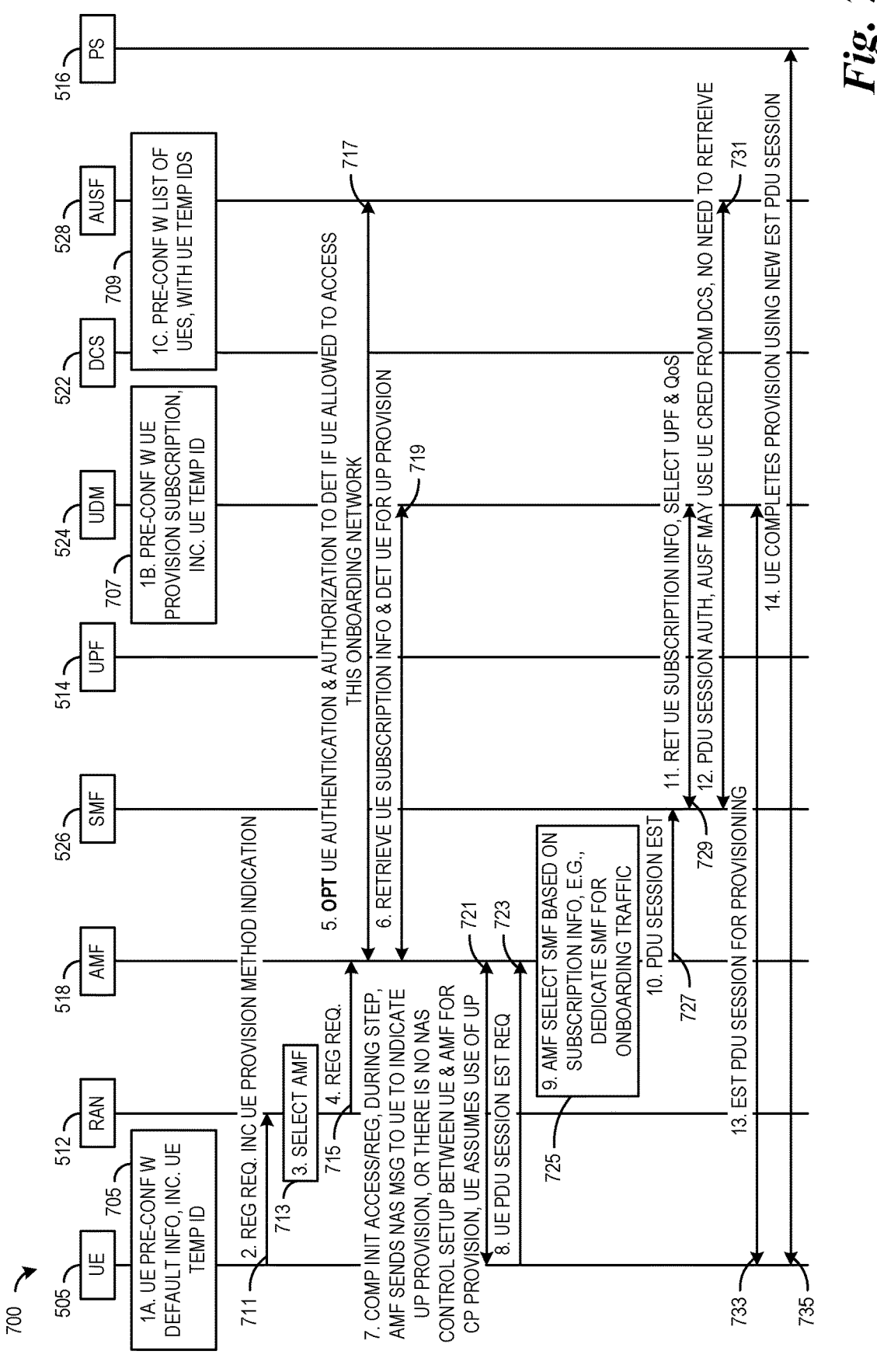
FIG. 7 illustrates processing performed and messaging exchanged by devices, network entities, and network functions participating in a UP based device provisioning procedure according to example embodiments presented herein.

FIG. 7 illustrates processing performed and messaging exchanged by devices, network entities, and network functions participating in a UP based device provisioning procedure. The devices, network entities, and network functions include UE 505, RAN 512 (e.g., access node), AMF 518, SMF 526, UPF 514, UDM 524, DCS 522, AUSF 528, and provisioning server 516.

UE 505 is preconfigured with default information, including the temporary identifier for UE 505 (block 705). In addition to UE 505 being preconfigured with default information, UDM 524 is preconfigured with provisioning subscription information for devices including UE 505 (block 707), and DCS 522 and AUSF 528 are preconfigured with a list of devices including UE 505 (block 709).

UE 505 transmits a NAS message to RAN 512, where the NAS message is a registration request message with the onboarding and provisioning indication information, including the provisioning method indication (event 711). The registration request message initiates the initial network registration phase, for example. RAN 512 selects an AMF for UE 505 (block 713). The selection of the AMF is in accordance with the temporary identifier of UE 505, for example. For discussion purposes, let AMF 518 be the AMF selected by RAN 512. RAN 512 transmits the registration request message to AMF 518 (event 715). RAN 512 forwards the registration request message received from UE 505 to AMF 518, for example.

AMF 518 optionally performs authentication and authorization for UE 505 (event 717). The authentication and authorization of UE 505 may be performed by AUSF 528. As an example, AUSF 528 authenticates and authorizes UE 505 based on preconfigured information, including the list of devices and device identifiers. The authentication and authorization for UE 505 may be implemented with AMF 518 directly interacting with DCS 522 to verify and authenticate UE 505 for provisioning. Alternatively, AMF 518 interacts with AUSF 528, which subsequently interacts with DCS 522 for provisioning. With AUSF 528 storing the provisioning credentials of UE 505, AUSF 528 may facilitate the cases in which AUSF 528 acting as an authenticator proxy to interact with DCS 522 for UE 505. AUSF 528 acting as authenticator proxy may be useful in situations where UE 505 is too small or constrained (e.g., UE 505 has a power constraint) to perform the authentication and authorization on its own during the provisioning procedure.

AMF 518 retrieves a network configuration profile for UE 505, which includes device subscription information associated with UE 505 (event 719). AMF 518 may retrieve the network configuration profile (including the device subscription information for UE 505) from UDM 524, for example. AMF 518 also determines that UE 505 is configured for UP based provisioning, which may be determined from the device subscription information, for example. AMF 518 and UE 505 complete initial network registration (event 721). Completing the initial network registration may include AMF 518 transmitting a NAS message to UE 505, where the NAS message indicates that UP based provisioning will be used, for example. Alternatively, if there is no NAS control setup between AMF 518 and UE 505 for CP based provisioning, UE 505 assumes that UP based provisioning will be used.

With initial network registration completed, UE 505 transmits a message to establish a PDU session (event 723). The message may be a PDU session establishment message transmitted to AMF 518, for example. AMF 518 selects a SMF in accordance with the subscription information of UE 505 (block 725). As an example, AMF 518 selects a dedicated SMF for onboarding traffic. For discussion purposes, consider the situation where SMF 526 is the SMF selected by AMF 518. AMF 518 transmits a PDU session establishment message to SMF 526 (event 727). The PDU session establishment message initiates the establishment of the PDU session for UE 505.

SMF 526 retrieves the subscription information for UE 505 (event 729). The subscription information may be retrieved from UDM 524, for example. In other embodiments, the subscription information may be stored in a different network entity, such as a DCS or another network function used in other provisioning architectures. SMF 526 selects a UPF for UE 505, as well as QoS requirements for the PDU session. SMF 526 performs PDU session authentication (event 731). The PDU session authentication may involve AUSF 528, for example. AUSF 528 may utilize the credentials of UE 505 from DCS 522, for example.

The PDU session of UE 505 is established for provisioning purposes (event 733). The establishment of the PDU session may involve an interchange of messages between UE 505 and UDM 524, for example. The provisioning of UE 505 completes (event 735). The provisioning of UE 505 completes with the provisioning information for UE 505 being provided to UE 505 by provisioning server 516, over the PDU session, for example.

Figure 8:
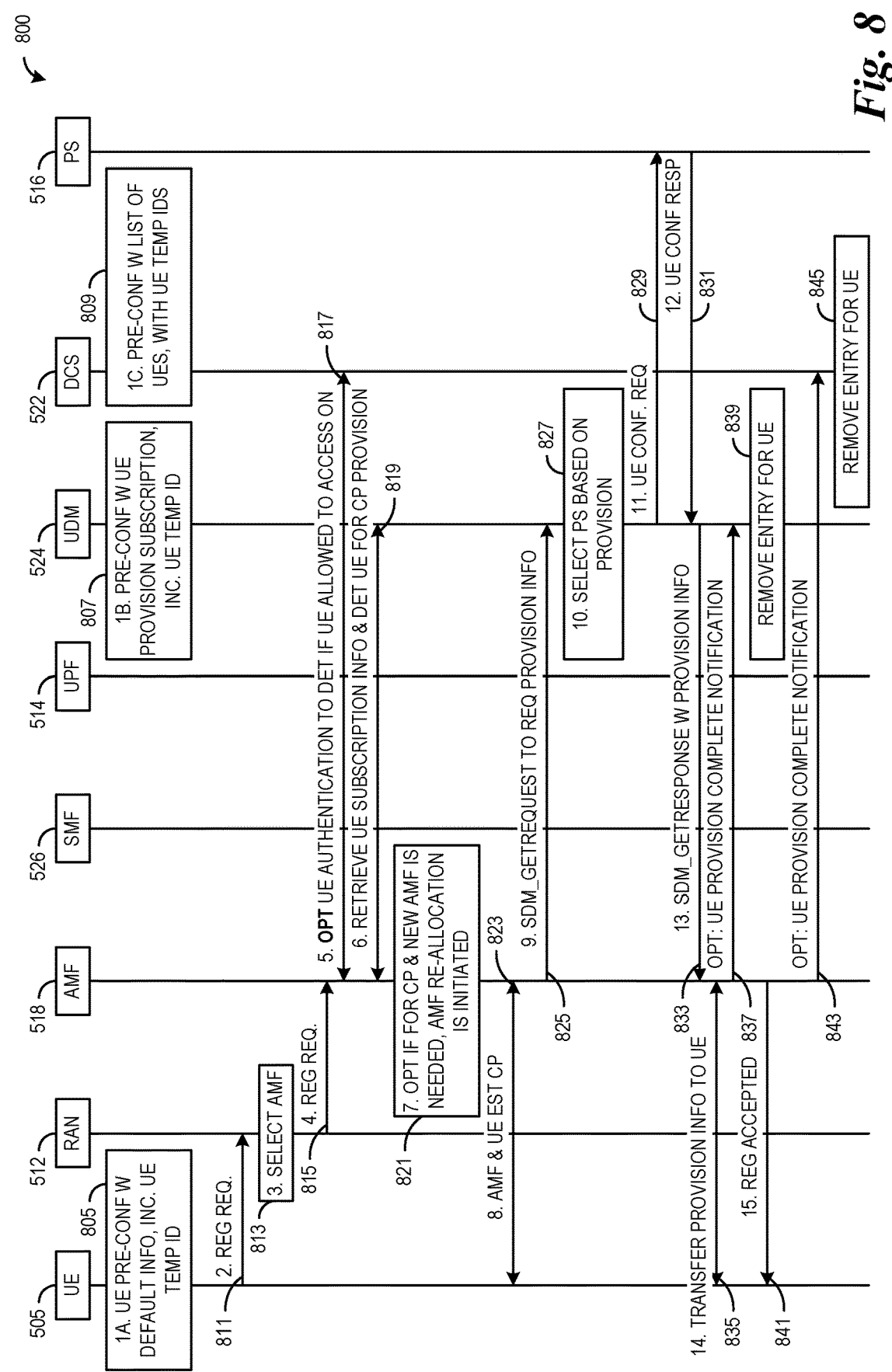
FIG. 8 illustrates processing performed and messaging exchanged by devices, network entities, and network functions participating in a CP based device provisioning procedure according to example embodiments presented herein.

FIG. 8 illustrates processing performed and messaging exchanged by devices, network entities, and network functions participating in a CP based device provisioning procedure. The devices, network entities, and network functions include UE 505, RAN 512 (e.g., access node), AMF 518, SMF 526, UPF 514, UDM 524, DCS 522, and provisioning server 516.

UE 505 is preconfigured with default information, including the temporary identifier for UE 505 (block 805). In addition to UE 505 being preconfigured with default information, UDM 524 is preconfigured with provisioning subscription information for devices including UE 505 (block 807), and DCS 522 and AUSF 528 are preconfigured with a list of devices including UE 505 (block 809).

UE 505 transmits a NAS message to RAN 512, where the NAS message is a registration request message with the onboarding and provisioning indication information, including the provisioning method indication (event 811). The registration request message initiates the initial network registration phase, for example. RAN 512 selects an AMF for UE 505 (block 813). The selection of the AMF is in accordance with the temporary identifier of UE 505, for example. For discussion purposes, let AMF 518 be the AMF selected by RAN 512. RAN 512 transmits the registration request message to AMF 518 (event 815). RAN 512 forwards the registration request message received from UE 505 to AMF 518, for example.

AMF 518 optionally performs authentication of UE 505 (event 817). The authentication of UE 505 may be performed by DCS 522, for example. The authentication of UE 505 may be performed to determine if UE 505 is allowed to access the onboarding network, for example. AMF 518 retrieves a network configuration profile for UE 505, which includes device subscription information associated with UE 505 (event 819). AMF 518 may retrieve the network configuration profile (including the device subscription information for UE 505) from UDM 524, for example. AMF 518 also determines that UE 505 is configured for UP based provisioning, which may be determined from the device subscription information, for example. AMF 518 also determines that UE 505 is configured for CP based provisioning.

AMF 518 optionally initiates an AMF re-allocation (block 821). The AMF re-allocation may be initiated if the provisioning is CP based and if a new AMF is needed. In general, there may be multiple AMF instances in the communication system, with each AMF instance being dedicated for onboarding UEs from different operators, with only some of the AMF instances being capable of supporting CP based provisioning. Therefore, the AMF may be changed if the AMF cannot support CP based provisioning but the UE requires CP based provisioning. The AMF re-allocation results in a new AMF being selected for UE 505 should a new AMF be needed. AMF 518 and UE 505 establish a CP (event 823). AMF 518 and UE 505 exchange messages to establish the CP. AMF 518 transmits a request for provisioning information (event 825). The request may be transmitted to UDM 524 and in the form of a SDM_Get request message. The provisioning information may be requested in accordance with the temporary identifier of UE 505, for example.

UDM 524 selects a provisioning server (block 827). In the situation where a plurality of provisioning servers is available, UDM 524 selects one from the plurality of provisioning server based on the provisioning information of UE 505. For discussion purposes, consider the situation where provisioning server 516 is the provisioning server selected by UDM 524. UDM 524 requests the configuration of UE 505 from provisioning server 516 (event 829). UDM 524 may transmit a configuration request message to provisioning server 516 to request the configuration of UE 505. The configuration of UE 505 may be included in the provisioning information. UDM 524 receives the configuration of UE 505 (event 831). The provisioning information (the configuration of UE 505) may be received in a configuration response message responsive to the configuration request message.

UDM 524 transmits a response including the provisioning information to AMF 518 (event 833). The response may be in the form of a SDM_Get response message. AMF 518 transfers the provisioning information to UE 505 (event 835). The provisioning information may be transferred to UE 505 when UE 505 and AMF 518 exchange messaging.

AMF 518 optionally transmits a UE provisioning complete notification (event 837). The UE provisioning complete notification may be transmitted to UDM 524, which may delete an entry associated with UE 505 when the UE provisioning complete notification is received (block 839).

AMF 518 transmits a registration accepted message to UE 505 (event 841). The registration accepted message indicates to UE 505 that the registration request from UE 505 in event 811 has been accepted by the network.

AMF 518 optionally transmits a UE provisioning complete notification (event 843). The registration complete notification may be transmitted to DCS 522), which may delete an entry associated with UE 505 when the UE provisioning complete notification is received (block 845). Both events 837 and 843 may occur, only one of the events occur, or neither of the events occur, depending on the implementation.

Figure 9:
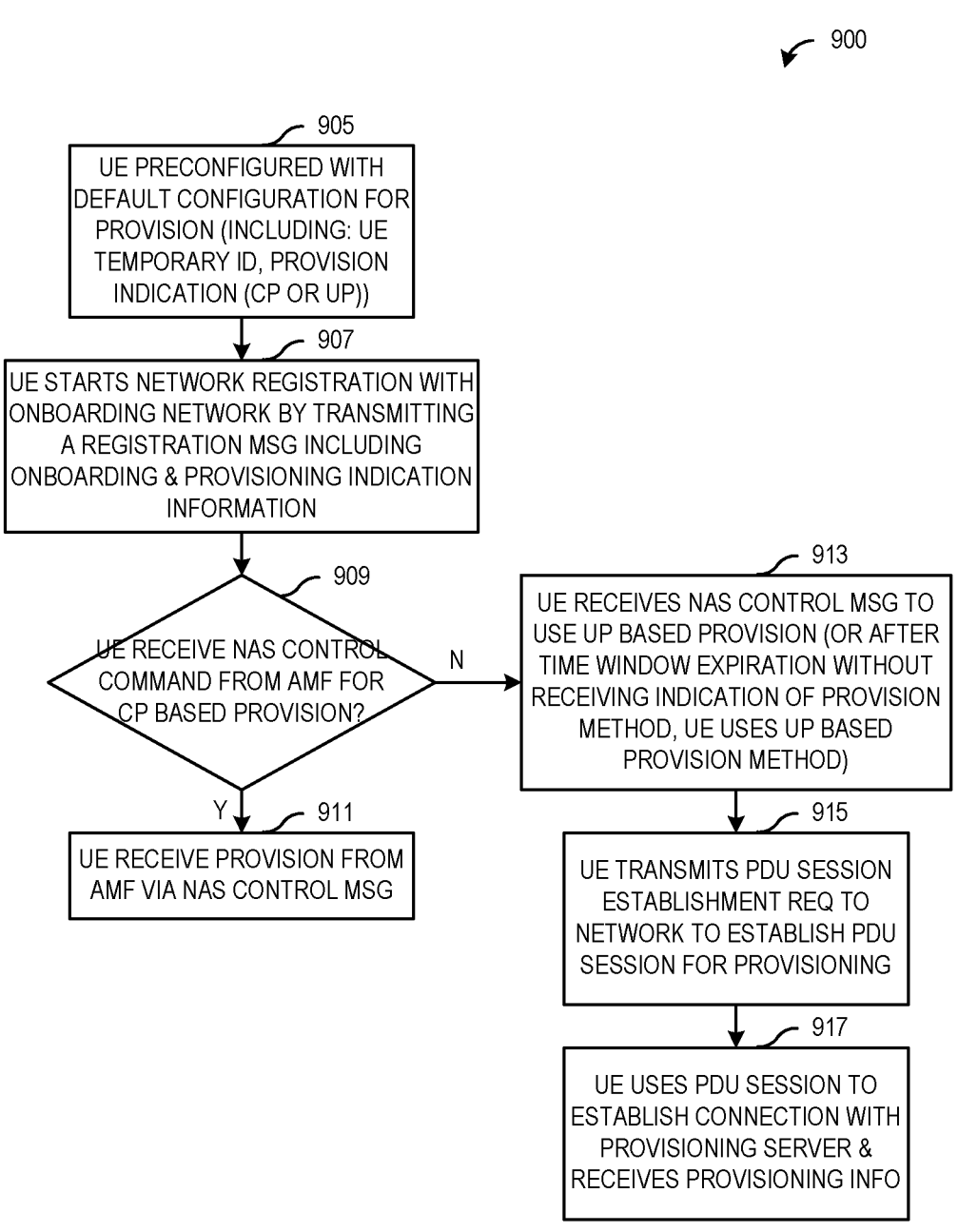
FIG. 9 illustrates a flow diagram of example operations occurring in a UE participating in a provisioning procedure according to example embodiments presented herein.

FIG. 9 illustrates a flow diagram of example operations 900 occurring in a UE participating in a provisioning procedure. Operations 900 may be indicative of operations occurring in a UE as the UE participates in a provisioning procedure where the UE transmits the provisioning method indication indicating the provisioning method supported by the UE.

Operations 900 begin with the UE being preconfigured with a default provisioning configuration (block 905). The default provisioning configuration includes a temporary identifier for the UE, and a provisioning method indication (e.g., CP or UP, or both CP and UP). The default provisioning configuration may be pre-programmed in the UE at manufacture, for example. The UE starts network registration with an onboarding network to establish a connection (block 907). The UE may start the network registration by transmitting a registration request message, where the registration request message includes the onboarding and provisioning indication information of the UE, which includes an indication indicating that the connection is for onboarding and provisioning or the provisioning method indication. The onboarding and provisioning indication information may alternatively include a capability indication of the UE. The capability indication of the UE indicates features or functionality supported by the UE, for example.

The UE performs a check to determine if a NAS control command has been received, where the NAS control command indicates that CP based provisioning will be performed (block 909). The NAS control command is received from the AMF. In an embodiment, the NAS control command may indicate that CP based provisioning or UP based provisioning will be performed. In an embodiment, the NAS control command only indicates that CP based provisioning will be performed. If the UE has received the NAS control command indicating that CP based provisioning will be performed, the UE receives provisioning information from the AMF (block 911). The provisioning information may be received in a subsequent NAS control command.

If the UE has received the NAS control command indicating that UP based provisioning or if a time window (or timer) associated with CP based provisioning expires with the UE not receiving the NAS control command indicating any type of provisioning method, the UE will perform UP based provisioning (block 913). The UE initiates a PDU session (block 915). The PDU session may be initiated by the UE transmitting a PDU session establishment request message to the network. The PDU session so initiated will be used for conveying provisioning information to the UE, for example. The PDU session is established with the provisioning server associated with the UE. The UE uses the PDU session to establish a connection with the provisioning server (block 917). The connection between the UE and the provisioning server is used to convey the provisioning session to the UE.

Figure 10:
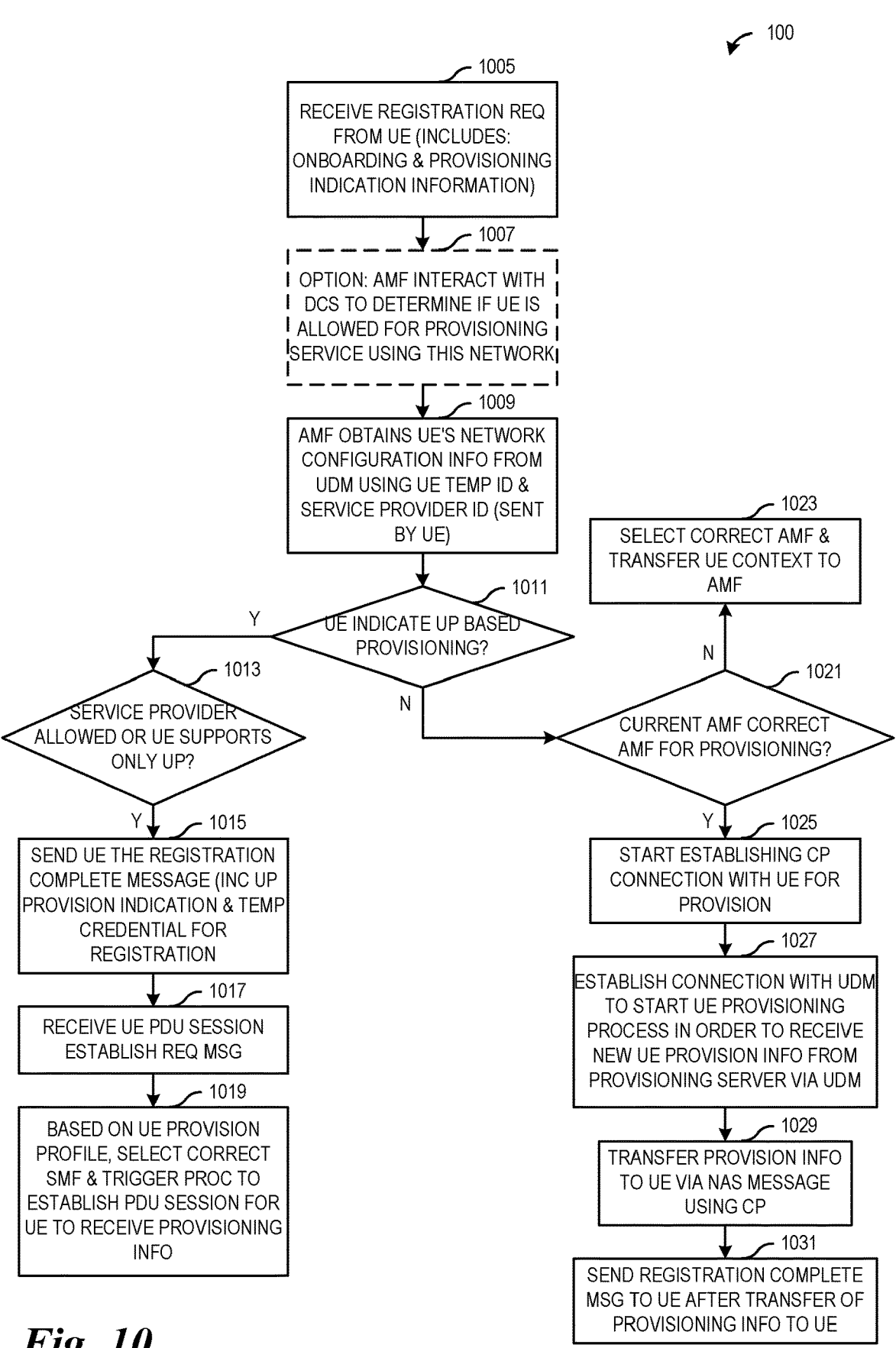
FIG. 10 illustrates a flow diagram of example operations occurring in an AMF participating in a provisioning procedure according to example embodiments presented herein.

FIG. 10 illustrates a flow diagram of example operations 1000 occurring in an AMF participating in a provisioning procedure. Operations 1000 may be indicative of operations occurring in an AMF as the AMF participates in a provisioning procedure where a UE transmits the provisioning method indication indicating the provisioning method supported by the UE.

Operations 1000 begin with the AMF receiving a registration request message to establish a connection (block 1005). The registration request message may be received from a UE initiating network registration, for example. The registration request message includes the onboarding and provisioning indication information of the UE, which includes an indication indicating that the connection is for onboarding and provisioning or the provisioning method indication. The onboarding and provisioning indication information may alternatively include a capability indication of the UE. The provisioning method indication may indicate that the UE supports both CP and UP based provisioning. Alternatively, the UE indicates that it supports only either CP or UP based provisioning, or the UE indicates that is supports neither CP nor UP based provisioning.

The AMF optionally interacts with the DCS to determine if the UE is allowed for provisioning service using the network (block 1007). As an example, the AMF interacts with the DCS and provides the DCS with the temporary identifier of the UE, the DCS uses the temporary identifier of the UE to determine if the UE is allowed to use the network for provisioning services, and informs the AMF regarding the UE.

The AMF obtains the network configuration profile (including device subscription information) of the UE (block 1009). The AMF may obtain the provisioning subscription information of the UE from the UDM. As an example, the AMF provides the temporary identifier of the UE and a service provider identifier associated with the UE to the UDM, and the UDM provides the network configuration profile to the AMF. The service provider identifier associated with the UE is provided by the AMF, for example, in the registration request message received from the UE.

The AMF performs a check to determine if the UE supports UP based provisioning (block 1011). The AMF checks the provisioning method indication to determine if the UE supports UP based provisioning, for example. If the UE supports UP based provisioning, the AMF performs another check to determine if the service provider associated with the UE is allowed (e.g., the service provider is allowed access in the network) or if the UE supports only UP based provisioning (block 1013). If the service provider is not allowed or if the UE does not only support UP based provision, a registration rejection indication is sent to the UE. The registration rejection indication indicates to the UE that the registration request from the UE has been rejected. The registration rejection indication may be sent by the AMF, for example.

If the service provider associated with the UE is allowed or if the UE supports only UP based provisioning, the AMF sends the UE a registration complete message (block 1015). The registration complete message includes an UP provisioning indication and a temporary credential for registration, for example. The AMF receives a PDU session establish request message (block 1017). The PDU session establish request message initiates the establishment of a PDU session for the UE, and may be received from the UE. The AMF selects a SMF (block 1019). The AMF selects the SMF for the PDU session based on the UE provisioning subscription profile, for example. The AMF also triggers a procedure to establish the PDU session for the UE. The PDU session allows the UE to receive the provisioning information.

If the UE did not indicate that UP based provisioning is supported (block 1011), the AMF performs a check to determine if the current AMF (i.e., the AMF) is the correct AMF for provisioning the UE (block 1021). If the current AMF is not the correct AMF, the AMF selects the correct AMF for the provisioning (block 1023). After selecting the correct AMF, the AMF transfers the UE context to the correct AMF. The correct AMF may continue and complete the provisioning procedure, such as continuing with block 1025, discussed below.

If the current AMF is the correct AMF, the AMF starts to establish a CP connection with the UE (block 1025). The AMF establishes a connection with the UDM (block 1027). The establishment of the connection with the UDM starts the UE provisioning process and allows the AMF to receive the UE provisioning information from the provisioning server. The UE provisioning information is received from the provisioning server with the UDM serving as the intermediary. As an example, the AMF establishes the connection with the UDM using a SDM_Get request message, and the UDM sends the UE provisioning information to the AMF using a SDM_Get response message.

The AMD transfers the UE provisioning information to the UE (block 1029). The UE provisioning information is transferred to the UE using a NAS message, for example. The AMF sends a registration complete message (block 1031). The registration complete message may be sent after the transfer of the UE provisioning information and marks the end of the registration process initiated by the UE in block 1005.

Figure 11:
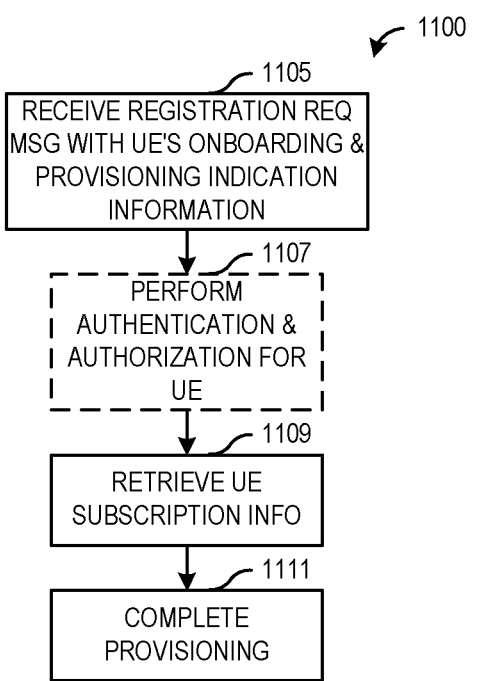
FIG. 11 illustrates a flow diagram of example operations occurring in an AMF participating in a provisioning procedure for a UE where the UE provides the provisioning method indication according to example embodiments presented herein.

FIG. 11 illustrates a flow diagram of example operations 1100 occurring in an AMF participating in a provisioning procedure for a UE where the UE provides the provisioning method indication. Operations 1100 may be indicative of operations occurring in an AMF as the AMF participates in a provisioning procedure where the UE initiates the provisioning process with a registration request message including the provisioning method indication.

Operations 1100 begin with the AMF receiving a registration request message with the onboarding and provisioning indication information, including the provisioning method indication (block 1105). The registration request message is received from the UE, for example. The provisioning method indication indicates the provisioning method supported by the UE, e.g., CP or UP based provisioning or both CP and UP based provisioning. The AMF optionally performs authentication and authorization for the UE (block 1107). The authentication and authorization may be performed by the AUSF of the network. The AMF retrieves the network configuration profile for the UE, which includes device subscription information for the UE (block 1109). The AMF may retrieve the network configuration profile for the UE from the UDM, for example. The AMF completes the provisioning for the UE (block 1111). The AMF completes the provisioning for the UE based on the provisioning method indication provided by the UE. As an example, if the provisioning method indication indicated that the UE supports UP based provisioning, the AMF completes the provisioning of the UE using UP based provisioning, while if the provisioning method indication indicated that the UE supports CP based provisioning, the AMF completes the provisioning of the UE using CP based provisioning.

In an embodiment, enhancements to the UDM include:

A new provisioning subscription information model including device based and service based type onboarding subscriptions, new subscription information for onboarding, CP or DP selection, user datagram protocol (UDP) profile for onboarding, etc.

Using subscription information for provisioning server selection for CP based provisioning method, i.e., the provisioning method indication and the capability indication.

A new mechanism for establishing and deleting provisioning subscription information, i.e., the AMF detection and triggering mechanism.

In an embodiment, enhancements to the AMF include:

New network access and SMF selection mechanisms based on provisioning subscription information, includes retrieving the device subscription information from the UDM and selecting the AMF based on the subscription information.

New NAS control message for provisioning control, where the NAS control message conveying the provisioning method indication (e.g., CP or UP) from the device.

New mechanisms and interactions with the DCS and AUSF for device verification and authentication, with the AMF based on the device subscription information to trigger the interaction between the DCS and AUSF.

New mechanism for device provisioning status detection and notification. in an embodiment, enhancements to the AUSF include:

New interactions with the DCS for the provisioning credentials of the device, including receiving the credentials from the DCS, the AUSF to receive the credential keys from the DCS and acts as a proxy for the onboarding device after the DCS verifies the device.

Figures 12, 14:
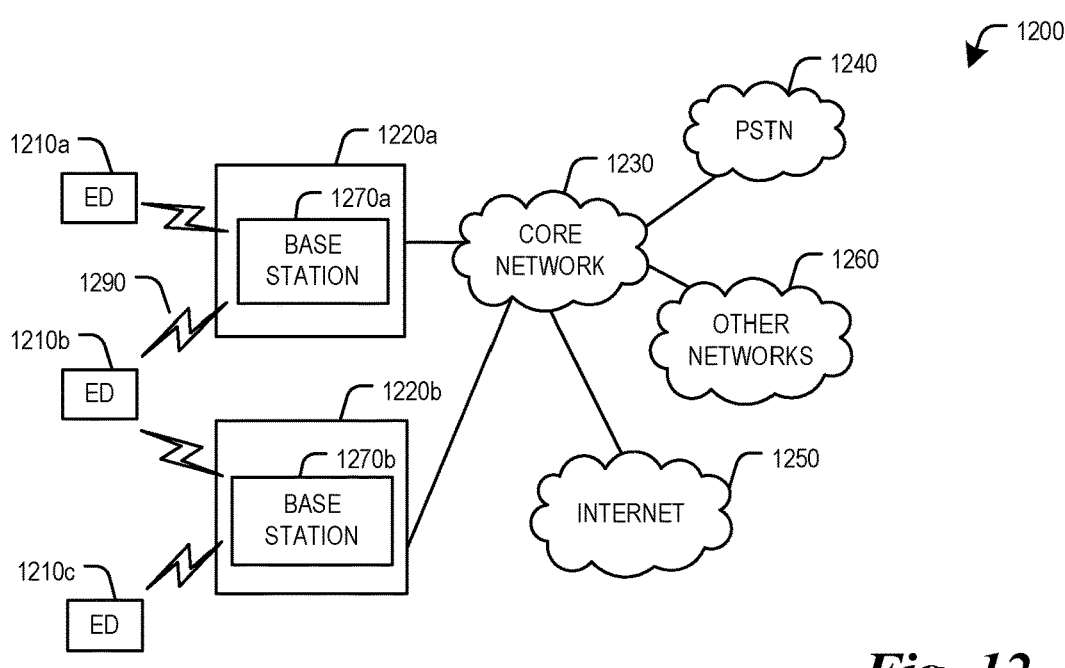
FIG. 12 illustrates an example communication system according to example embodiments presented herein.
FIG. 14 is a block diagram of a computing system that may be used for implementing the devices and methods disclosed herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210a-1210c are configured to interface and communicate with the Internet 1250 and may access the core network 1230, the PSTN 1240, or the other networks 1260.

In the embodiment shown in FIG. 12, the base station 1270a forms part of the RAN 1220a, which may include other base stations, elements, or devices. Also, the base station 1270b forms part of the RAN 1220b, which may include other base stations, elements, or devices. Each base station 1270a-1270b operates to transmit or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
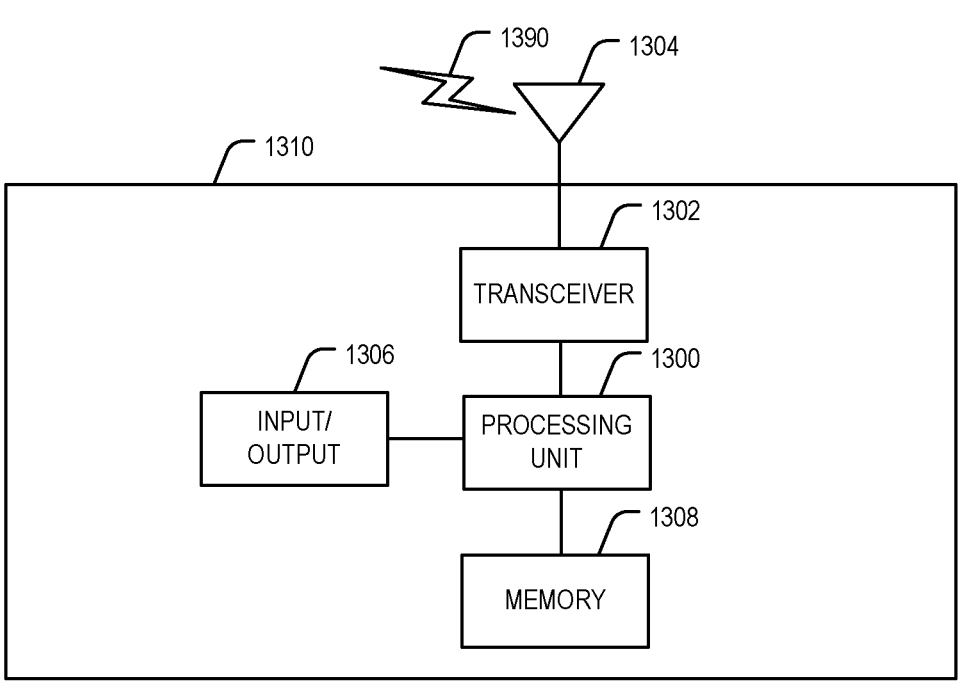
FIGS. 13A and 13B illustrate example devices that may implement the methods and teachings according to this disclosure.
Figure 13B:
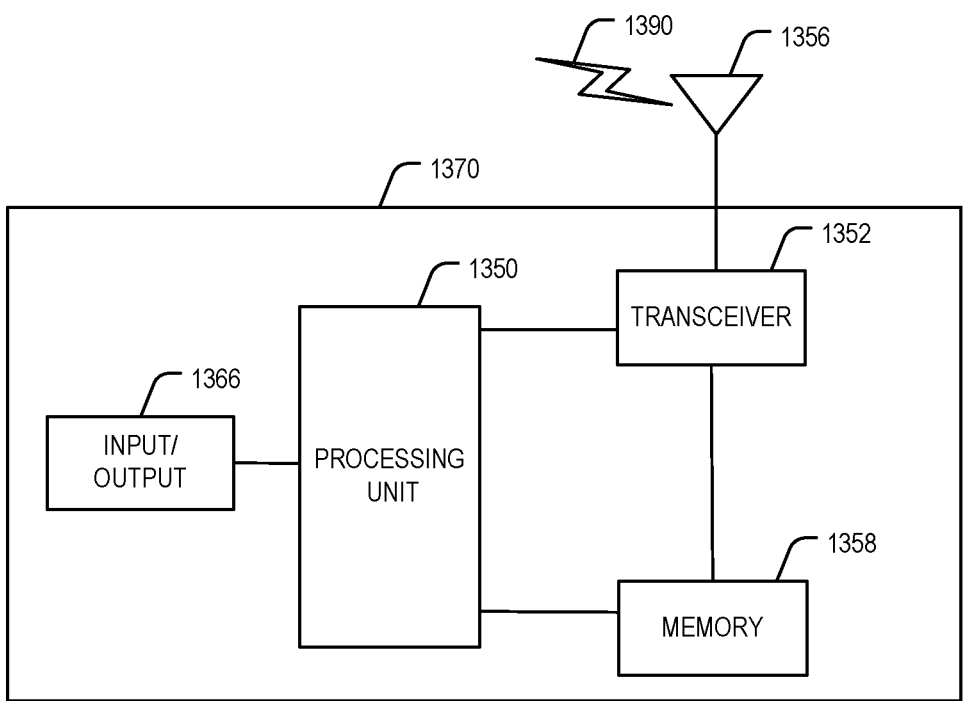

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a completing unit or module, a determining unit or module, a completing unit or module, or an establishing unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

The invention claimed is:

1. A method comprising:

transmitting, by a user equipment (UE), a registration request message to establish a connection for onboarding, the registration request message comprising onboarding and provisioning indication information and a temporary identifier for the UE, wherein the temporary identifier for the UE is used for onboarding, the onboarding and provisioning indication information comprising at least one of an indication indicating the connection is for the onboarding and provisioning, or a provisioning method indication indicating a provisioning method preferred or supported by the UE, the provisioning method indication indicating user plane (UP) based remote provisioning; and completing, by the UE with a network entity, provisioning in response to transmitting the registration request message with the onboarding and provisioning indication information and the temporary identifier for the UE, the completing the provisioning comprising:

determining, by the UE, an expiration of a timer associated with control plane (CP) based provisioning without having received a third control message including provisioning information;

establishing, by the UE, a protocol data unit (PDU) session for the provisioning; and receiving, by the UE from a provisioning server (PS), the provisioning information.

2. The method of claim 1, the provisioning method indication further indicating CP based remote provisioning.

3. The method of claim 2, the provisioning method indication indicating the CP based remote provisioning, and the completing the provisioning comprises:

receiving, by the UE from the network entity, provisioning information in a first control message.

4. The method of claim 1, the provisioning method indication indicating the provisioning method preferred by the UE, the method further comprising:

receiving, by the UE from the network entity, a second control message indicating the provisioning method that will be used for provisioning, and the completing the provisioning comprising:

completing the provisioning in accordance with the provisioning method indicated by the second control message.

5. The method of claim 1, the registration request message further comprises an onboarding method capability indication for the UE, the onboarding method capability indication indicating a provisioning method supported by the UE.

6. The method of claim 5, the temporary identifier comprising at least one of a sequence number from a range assigned to a service provider associated with the UE, an identifier of the service provider owning a subscription of the UE, or a secret mark value determined in accordance with a credential used for onboarding for the UE.

7. The method of claim 6, the secret mark value being provided by the service provider owning the subscription of the UE.

8. The method of claim 1, the network entity comprising an access and mobility management function (AMF).

9. The method of claim 1, the onboarding and provisioning indication information comprising a PS address or a provisioning domain name.

10. The method of claim 9, the onboarding and provisioning indication information implicitly indicating a provisioning method supported by the UE.

11. A method comprising:

receiving, by a network entity from a user equipment (UE), a registration request message to establish a connection for onboarding, the registration request message comprising an onboarding and provisioning indication information and a temporary identifier for the UE, wherein the temporary identifier for the UE is used for onboarding, the onboarding and provisioning indication information comprising at least one of an indication indicating the connection is for the onboarding and provisioning, or a provisioning method indication indicating a provisioning method preferred or supported by the UE, the provisioning method indication indicating user plane (UP) based remote provisioning;

retrieving, by the network entity, a network configuration profile associated with the UE; and completing, by the network entity with the UE, provisioning of the UE in response to transmitting the registration request message the network configuration profile and the onboarding and provisioning indication information and the temporary identifier for the UE, wherein the UE determines an expiration of a timer associated with control plane (CP) based provisioning without having received a third control message including provisioning information, establishes a protocol data unit (PDU) session for the provisioning, and receives, from a provisioning server (PS), the provisioning information.

12. The method of claim 11, the provisioning method further comprising CP based remote provisioning.

13. The method of claim 11, the provisioning method indication indicating that the connection is for the onboarding.

14. The method of claim 11, the network configuration profile comprising a user subscription profile or network configuration information used to configure the network entity for the onboarding and provisioning.

15. The method of claim 11, the network configuration profile comprising at least one of identifier information of a service provider owning a subscription of the UE, a provisioning method, a provisioning server address, a network slice for the onboarding and provisioning information, a PDU profile, or a selection criteria for another network entity associated with the onboarding and provisioning.

16. The method of claim 15, the PDU profile comprising at least one of quality of service (QoS) requirements or PDU session reusable information for after provisioning, the PDU session reusable information for after provisioning including an indication if a PDU session can be reused after the onboarding, or a waiting time to terminate the PDU session after the provisioning completes.

17. The method of claim 15, the selection criteria comprising an access and mobility management function (AMF) or (SMF) selection criteria.

18. The method of claim 11, the network configuration profile being retrieved from at least one of a unified data management (UDM) function, a default credential server, a policy configuration function (PCF), an operation support system (OSS), a network repository function (NRF), or another network entity providing network configuration and policy management.

19. The method of claim 11, the onboarding and provisioning indication information comprising a PS address or a provisioning domain name.

20. The method of claim 19, further comprising:

determining a provisioning method supported by the UE in accordance with the onboarding and provisioning indication information.

21. A user equipment (UE) comprising:

one or more processors; and a non-transitory memory storage comprising instructions that, when executed by the one or more processors, cause the UE to perform operations including:

transmitting a registration request message to establish a connection for onboarding, the registration request message comprising onboarding and provisioning indication information and a temporary identifier for the UE, wherein the temporary identifier for the UE is used for onboarding, the onboarding and provisioning indication information comprising at least one of an indication indicating the connection is for the onboarding and provisioning, or a provisioning method indication indicating a provisioning method preferred or supported by the UE, the provisioning method indication indicating user plane (UP) based remote provisioning; and completing, with a network entity, provisioning in response to transmitting the registration request message with the onboarding and provisioning indication information and the temporary identifier for the UE, the completing the provisioning comprising:

determining an expiration of a timer associated with control plane (CP) based provisioning without having received a third control message including provisioning information;

establishing a protocol data unit (PDU) session for the provisioning; and receiving, from a provisioning server (PS), the provisioning information.

22. A network entity comprising:

one or more processors; and a non-transitory memory storage comprising instructions that, when executed by the one or more processors, cause the network entity to perform operations including:

receiving, from a user equipment (UE), a registration request message to establish a connection for onboarding, the registration request message comprising an onboarding and provisioning indication information and a temporary identifier for the UE, wherein the temporary identifier for the UE is used for onboarding, the onboarding and provisioning indication information comprising at least one of an indication indicating the connection is for the onboarding and provisioning, or a provisioning method indication indicating a provisioning method preferred or supported by the UE, the provisioning method indication indicating user plane (UP) based remote provisioning;

retrieving a network configuration profile associated with the UE; and completing, with the UE, provisioning of the UE in response to transmitting the registration request message with the network configuration profile and the onboarding and provisioning indication information and the temporary identifier for the UE, wherein the UE determines an expiration of a timer associated with control plane (CP) based provisioning without having received a third control message including provisioning information, establishes a protocol data unit (PDU) session for the provisioning, and receives, from a provisioning server (PS), the provisioning information.

\* \* \* \* \*